(12) United States Patent
Ketzer et al.

(10) Patent No.: US 10,957,913 B2
(45) Date of Patent: Mar. 23, 2021

(54) GAUNTLET LEAD-ACID BATTERY SYSTEMS

(71) Applicant: JOHNS MANVILLE, Denver, CO (US)

(72) Inventors: Michael Ketzer, Collenberg (DE); Souvik Nandi, Highlands Ranch, CO (US); Zhihua Guo, Centennial, CO (US); WeRNer Groh, Schwabmunchen (DE)

(73) Assignee: Johns Manville, Denver, CO (US)

( * ) Notice: Subject to any disclaimer, the term of this patent is extended or adjusted under 35 U.S.C. 154(b) by 635 days.

(21) Appl. No.: 15/136,707

(22) Filed: Apr. 22, 2016

(65) Prior Publication Data

US 2016/0315327 A1 Oct. 27, 2016

(30) Foreign Application Priority Data

Apr. 23, 2015 (EP) .................................. 15164762

(51) Int. Cl.
| | |
|---|---|
| *H01M 4/76* | (2006.01) |
| *H01M 4/14* | (2006.01) |
| *H01M 4/38* | (2006.01) |
| *H01M 4/62* | (2006.01) |
| *H01M 2/02* | (2006.01) |
| *H01M 2/18* | (2006.01) |
| *H01M 10/14* | (2006.01) |
| *H01M 50/116* | (2021.01) |
| *H01M 50/409* | (2021.01) |
| *H01M 50/463* | (2021.01) |
| *H01M 4/02* | (2006.01) |

(52) U.S. Cl.
CPC ............. *H01M 4/765* (2013.01); *H01M 4/14* (2013.01); *H01M 4/38* (2013.01); *H01M 4/625* (2013.01); *H01M 10/14* (2013.01); *H01M 50/116* (2021.01); *H01M 50/409* (2021.01); *H01M 50/463* (2021.01); *H01M 2004/021* (2013.01); *H01M 2004/028* (2013.01)

(58) Field of Classification Search
CPC ........ H01M 2/0275; H01M 2/16; H01M 2/18; H01M 4/14; H01M 4/38; H01M 4/625; H01M 4/765; H01M 10/14
USPC .......................................................... 429/66
See application file for complete search history.

(56) References Cited

U.S. PATENT DOCUMENTS

| | | | | |
|---|---|---|---|---|
| 3,885,988 | A * | 5/1975 | Bohle ..................... | H01M 4/16 141/1.1 |
| 4,537,842 | A * | 8/1985 | Sundberg .............. | H01M 4/765 429/140 |
| 5,478,677 | A * | 12/1995 | Choi ..................... | H01M 4/765 429/140 |
| 2006/0269801 | A1* | 11/2006 | Honbo ................ | H01M 2/0242 429/7 |

(Continued)

FOREIGN PATENT DOCUMENTS

| | | |
|---|---|---|
| DE | 10 2013 105334 A1 | 11/2014 |
| EP | 0 721 671 A1 | 7/1996 |

(Continued)

*Primary Examiner* — Brittany L Raymond
(74) *Attorney, Agent, or Firm* — Robert D. Touslee (57) ABSTRACT

A lead-acid battery electrode including a tubular bag. The tubular bag includes a textile fabric, wherein the textile fabric includes a consolidated binder with thermoplastic properties and at least one electrically conductive additive.

22 Claims, 3 Drawing Sheets

(56) References Cited

U.S. PATENT DOCUMENTS

| | | |
|---|---|---|
| 2009/0186259 A1 | 7/2009 | Lambert |
| 2010/0015372 A1* | 1/2010 | Peruzzo .................. H01M 4/68 |
| | | 428/36.1 |
| 2012/0040251 A1* | 2/2012 | Wetzel .................. H01M 10/06 |
| | | 429/246 |

FOREIGN PATENT DOCUMENTS

| | | |
|---|---|---|
| EP | 1 286 403 A2 | 8/2002 |
| EP | 1 950 768 A1 | 7/2008 |
| EP | 1 961 059 A1 | 8/2008 |
| WO | 2006/117320 A1 | 11/2006 |
| WO | 2007/090893 A1 | 8/2007 |

\* cited by examiner

GAUNTLET LEAD-ACID BATTERY SYSTEMS

FIELD OF THE INVENTION

The disclosure generally relates to lead-acid batteries.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Lead-acid batteries are widely used because of their reliability and relatively low cost. For example, most automobiles include a lead-acid battery to start the engine and power various onboard systems. Although there are many types of lead-acid batteries, their general construction includes "positive" and "negative" electrodes (e.g., lead or lead alloy electrodes) in contact with an acid electrolyte, typically dilute sulfuric acid. During discharge, the lead-acid battery produces electricity as the sulfuric acid reacts with the electrodes. More specifically, the acid electrolyte combines with the negative and positive electrodes to form lead sulfate. As lead sulfate forms, the negative electrode releases electrons and the positive plate loses electrons. The net positive charge on the positive electrode attracts the excess negative electrons from the negative electrode enabling the battery to power a load. To recharge the acid-battery, the chemical process is reversed. As lead sulfate forms on the positive electrode, the positive electrode gradually loses the ability to attract electrons from the negative electrode reducing the ability of the cell to continue the chemical reaction and produce power.

SUMMARY OF THE INVENTION

In this case, the tube bags surround the rod-shaped electrode compound and a large number of individual tubes, which are mostly formed like a cartridge belt, form the positive electrode of the power storage battery. Due to the large number of these rod-shaped electrodes, a large active electrode surface is achieved. The tube bag contributes to the mechanical stability of the electrode.

As for power storage batteries of the lead-acid type, the materials that form the tube bags have certain technical properties. Due to the change in volume of the electrode at each charge/discharge cycle, this includes in particular the strength and elasticity of the bag material. In addition, chemical stability, sufficient porosity, and high electrical conductivity are characteristics of the bag material. Since certain substances harmfully affect the battery operation, the bag material may not contain or may limit the amount of these substances (in particular certain metal ions).

The embodiments below disclose an improved tube bags based on textile fabrics, which, on the one hand, meet the technical requirements and the legal regulations, and on the other hand, are available under economic aspects and additionally have improved properties in terms of application technology (e.g., reduced battery internal resistance). Another object is the processability of the improved tube bags by means of the known and established procedures so that investments can be kept at a low level.

The embodiments below disclose tubular bags of the cartridge belt type for lead-acid batteries composed of a textile fabric, characterized in that the textile fabric, which forms the tubular bags, is equipped with at least one consolidated binder with thermoplastic properties and at least one electrically conductive additive.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
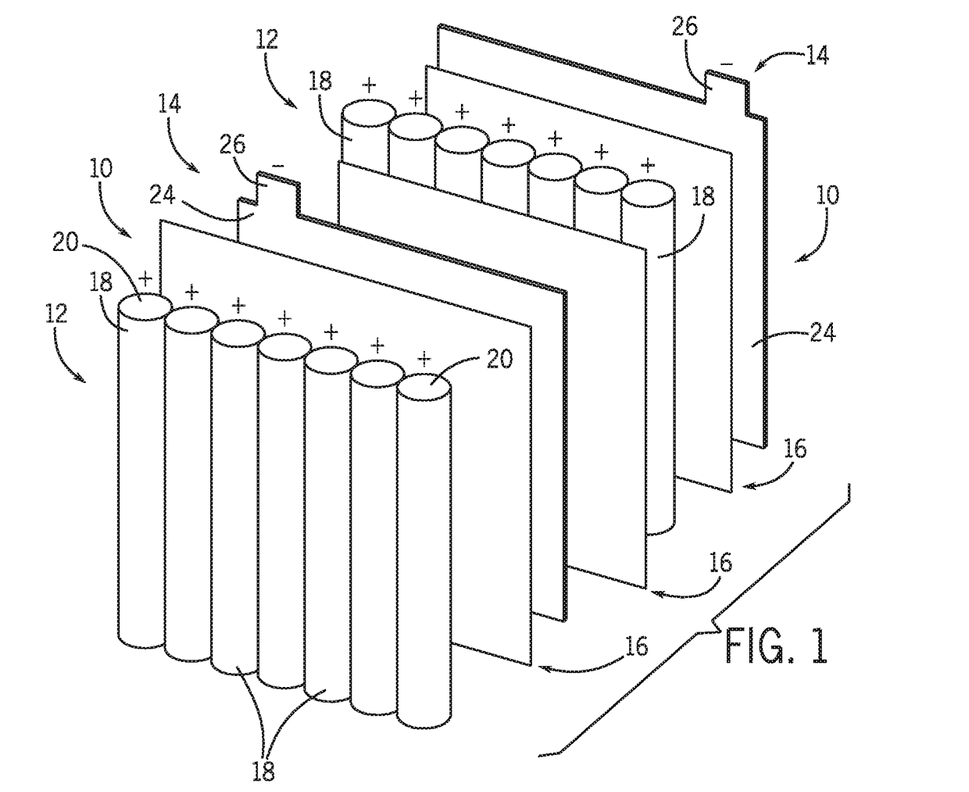
FIG. 1 is an exploded view of an embodiment of a lead-acid battery cell.

FIG. 1 is an exploded view of an embodiment of two lead-acid battery cells 10. Each cell 10 provides an electromotive force (i.e., volts) that may be used for powering a load (e.g., car, lights, radio, etc.). Lead-acid batteries may include multiple cells 10 in series or parallel to either increase the voltage or current flow. The cells 10 include a positive electrode 12 and a negative electrode 14 separated by a battery separator 16. The positive electrode 12 is formed out of a plurality of tubes or gauntlets 18 that contain or hold a positive active material 20 made out of a lead alloy material (e.g., lead dioxide). The gauntlets 18 provide structural support for a positive active material 20 and may be made out woven or non-woven fibers. As illustrated, the tubes or gauntlets 20 may be coupled together (e.g., with an adhesive, thread, etc.) in a cartridge belt fashion. In some embodiments, the gauntlets 18 and/or active material 20 couple to a positive terminal 22 (shown in FIGS. 3 and 4) to facilitate an electrical connection to the negative electrode 14. As illustrated, the negative electrode 14 may be a plate that supports a negative active material 24 (e.g., a lead alloy)

that is coated or pasted onto a plate (e.g., conductive plate). To facilitate an electrical connection to the positive electrode 12 the negative electrode 14 includes a negative terminal 26.

An electro-chemical reaction occurs between the positive and negative electrodes 12, 14 when they contact an electrolyte (e.g., sulfuric acid mixed with water). In the chemical reaction (i.e., discharge of the cell 10), the negative plate 14 releases electrons and the positive plate 12 loses electrons as the positive and negative active material 20, 24 changes into lead sulfate. The net positive charge on the positive plate attracts the excess negative electrons from the negative plate producing electricity. As will be explained below, the tubes or gauntlets 18 are conductive in order to facilitate the reaction. More specifically, the conductivity of the tubes 18 facilitates electron flow to the positive active material 20 that then attracts ions in the electrolyte during the chemical reaction. To block electricity from flowing directly between the positive and negative electrodes 12, 14, the cell 10 includes a battery separator 16. As illustrated, the battery separator 16 is positioned between the positive and negative electrodes 12, 14 to prevent electricity from bypassing the terminals 22 and 26. However, the battery separator 16 still enables ionic transport to continue the chemical reaction. In some embodiments, the separator 16 may be a microporous membrane made out of a polymeric film that has negligible conductance. The polymeric film may include micro-sized voids that allow ionic transport (i.e., transport of ionic charge carriers) across the separator 16. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, or combination thereof. In some embodiments, the separator 16 may be an absorbent glass mat (AGM) made out of glass fibers or a combination of glass fibers and other fibers. The AGM absorbs the electrolyte (e.g., sulfuric acid and water) used in the chemical reaction but still separates the electrodes 12, 14 from each other.

During the chemical reaction the positive and negative active material 20, 24 expand with the formation of lead sulfate. Similarly, when the battery is recharged the positive and negative active material 20, 24 contract as the lead sulfate dissolves. Over time the expansion and contraction of the positive and negative material 20, 24 may cause pieces of the positive and negative material 20, 24 to separate from the electrodes 12, 14. The separation of positive and negative material 20, 24 may be referred to as "shedding." To block shedding of the positive active material 20, the positive active material 20 is wrapped in the tube or gauntlet 18.

Figure 2:
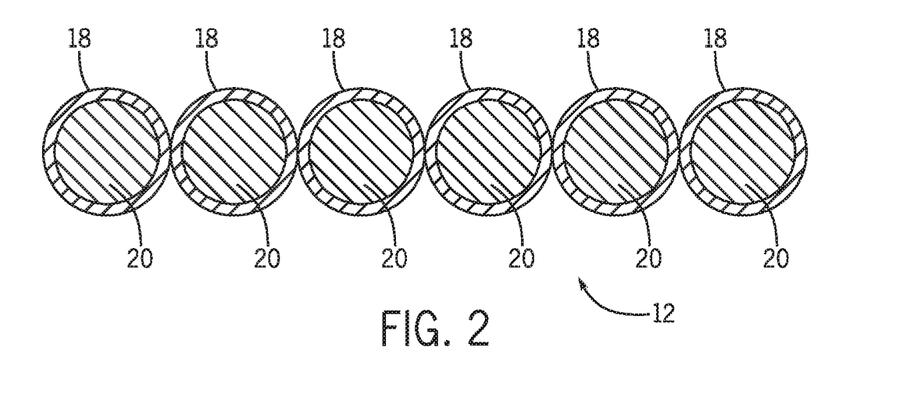
FIG. 2 is a cross-sectional top view of an embodiment of a positive electrode.

FIG. 2 is a cross-sectional top view of an embodiment of a lead-acid battery cell 10. As illustrated, the positive electrode 12 includes positive active material 20 within tubes or gauntlets 18. As will be discussed in detail below, the material of the tubes or gauntlets 18 may have various properties that facilitate the chemical reaction while preventing loss of the positive active material 20.

Figure 3:
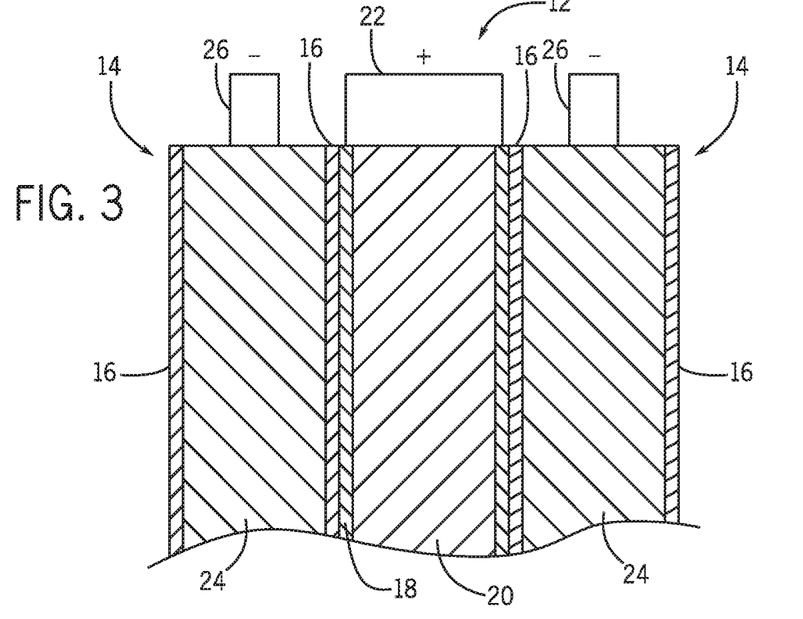
FIG. 3 is a cross-sectional side view of an embodiment of a lead-acid battery cell.

FIG. 3 is a cross-sectional view of an embodiment of a lead-acid battery cell 10. As illustrated, the positive electrode 12 includes a tube or gauntlet 18 that receives positive active material 20. In some embodiments, the positive electrode 12 rests between opposing negative electrodes 14 so that the positive electrode 12 forms part of two cells 10. As explained above, some embodiments may include a separator 16 between the positive electrode 12 and the negative electrode 14 in order to channel the flow of electricity through the terminals 22, 26.

Figure 4:
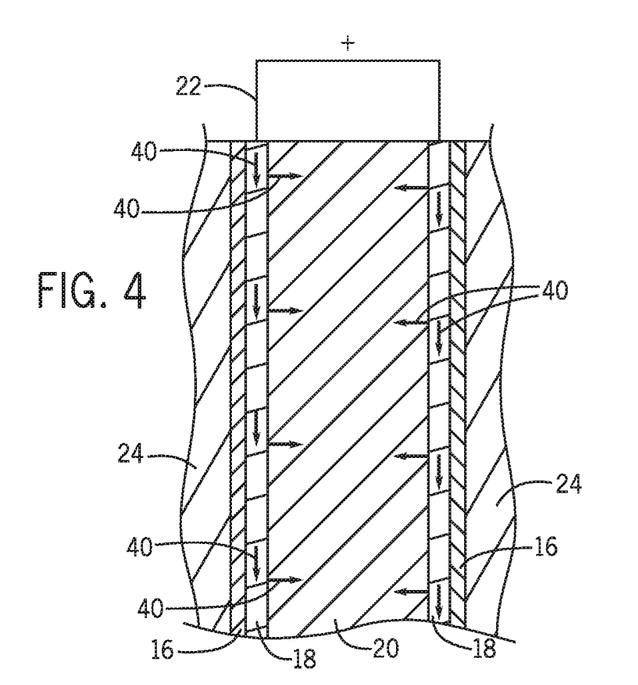
FIG. 4 is a cross-sectional side view of an embodiment of a positive electrode during a discharge cycle of a lead-acid battery cell.

FIG. 4 is a cross-sectional side view of an embodiment of a positive electrode 12 during a discharge cycle of a lead-acid battery cell 10. As explained above, during discharge the lead-acid battery produces electricity as the sulfuric acid reacts with the electrodes 12, 14. More specifically, the acid electrolyte combines with the negative and positive electrodes to form lead sulfate. As lead sulfate forms, the negative electrode releases electrons and the positive plate loses electrons. The net positive charge on the positive electrode attracts the excess negative electrons from the negative electrode enabling the battery to power a load. To recharge the acid-battery, the chemical process is reversed. As lead sulfate forms on the positive electrode 12, the positive electrode 12 gradually loses the ability to attract electrons from the negative electrode 14 reducing the ability of the cell 10 to continue the chemical reaction and produce power. To facilitate the reaction, the tubes or gauntlets 18 may be conductive (e.g., include conductive material, coatings, or a combination thereof, etc.). The conductivity of the tubes or gauntlets 18 provide additional pathways 40 that enable electrons to continue flowing to the positive active material 20 that would otherwise be blocked by the formation of lead sulfate. Accordingly, the tube or gauntlet 20 may increase the amount of electricity produced by the cell 10 by facilitating electron movement.

Figure 5:
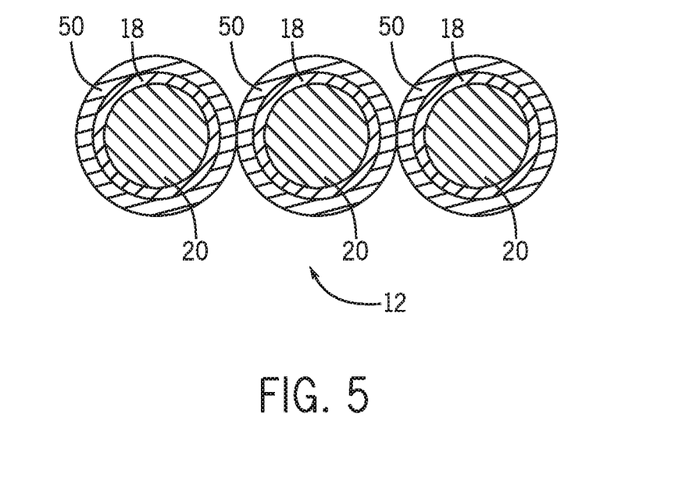
FIG. 5 is a cross-sectional top view of an embodiment of a positive electrode.

FIG. 5 is a cross-sectional top view of an embodiment of a positive electrode 12. As illustrated, the positive electrode 12 includes positive active material 18 surrounded by tubes or gauntlets 18. In operation, the tubes or gauntlets 18 block separation of the positive active material 18 during the chemical reactions that occur as the cell 10 charges and discharges. As explained above, the cell 10 include a separator 16 that blocks the flow of electricity directly between the negative active material 24 and the positive active material 20, or in other words blocks the flow of electricity between the electrodes 12, 14 except through the terminals 22, 26. In the embodiment of FIG. 5, the separator 16 may be in the form of a tube separator 50 that surrounds each of the tubes or gauntlets 18. In some embodiments, the tube separator 50 may be made out of the materials discussed below and/or other materials, but without conductive coatings or materials. Accordingly, the tube separator 50 may have negligible or no conductance. TEXTILE FABRIC Within the scope of this description, the term "textile fabric" is to be understood in its widest meaning. It may be used for all structures composed of fibers, which have been manufactured according to a surface-forming method. The fiber-forming materials are natural fibers, mineral fibers, glass fibers, but in particular fibers composed of synthetic polymers. Textile fabrics are in particular understood as being woven fabrics, scrims, knotted fabrics, knitted fabrics, non-woven fabrics, particularly preferred woven and/or non-woven fabrics.

Among the textile fabrics based on synthetic polymers, non-woven fabrics composed of fibers from synthetic polymers are preferred. In addition to non-woven fabrics composed of staple fibers, chopped fibers or tearing fibers, i.e. non-woven fabrics based on finite synthetic polymers, in particular spunbonded non-woven fabrics, so-called spunbonds, which are produced by random deposition of freshly melt-spun filaments, are preferred. These spunbonded non-woven fabrics consist of continuous synthetic fibers composed of melt-spinnable polymer materials. Suitable polymer materials include, for example, polyamides, such as e.g. polyhexamethylene diadipamide, polycaprolactam, wholly or partly aromatic polyamides ("aramids"), aliphatic polyamides, such as e.g. nylon, partly or wholly aromatic polyesters, polyphenylene sulfide (PPS), polymers having ether and keto groups, such as e.g. polyether ketones (PEKs) and polyether ether ketone (PEEK), polyolefins, such as e.g. polyethylene or polypropylene, or polybenzimidazoles.

Preferably, the spunbonded non-woven fabrics consist of melt-spinnable polyesters. The polyester material can be any known type suitable for fiber production. Such polyesters consist predominantly of components derived from aromatic dicarboxylic acids and from aliphatic diols. Commonly used aromatic dicarboxylic acid components are the bivalent radicals of benzenedicarboxylic acids, especially of the terephthalic acid and the isophthalic acid; commonly used diols have 2 to 4 carbon atoms, wherein ethylene glycol is particularly suitable. Spunbonded non-woven fabrics, which consist of at least 85 mol % of polyethylene terephthalate are particularly advantageous. The remaining 15 mol % are then comprised of dicarboxylic acid units and glycol units which act as so-called modifiers that influence the physical and chemical properties of the produced filaments. Examples of such dicarboxylic acid units are radicals of isophthalic acid or of aliphatic dicarboxylic acid, such as glutaric acid, adipic acid, and sebacic acid; examples of modifying diol radicals are those composed of longer-chain diols, such as propane diol or butane diol, of diethylene or triethylene glycol or, if present in small quantities, of polyglycol with a molar weight of approximately 500 to 2000.

Polyesters containing at least 95 mol % of polyethylene terephthalate (PET) are particularly preferred, in particular those composed of unmodified PET.

The spunbonded non-woven fabrics can also have, as consolidated binder with thermoplastic properties, at least one thermoplastic binder, the melting point of which is at least 10° C., preferably at least 20° C. below the melting point of the fiber of the spunbonded non-woven fabric.

The thermoplastic binder can be introduced in the form of a separate binder fiber, powder and/or granulate into the spunbonded non-woven fabric. Furthermore, the thermoplastic binder can also be available in the form of the low-melting component of a bi-component fiber.

For this embodiment, the quantity of thermoplastic binder is 5-50% by weight, preferably 10-30% by weight, each with reference to the total weight of the spunbonded non-woven fabric.

Insofar as the thermoplastic binder is introduced in the form of a separate binder fiber, a granulate or in the form of the low-melting component of a bi-component fiber, one speaks of a fusible binder-consolidated spunbonded non-woven fabric.

The fusible binder-consolidated spunbonded non-woven fabric therefore comprises carrier and hot melt adhesive fibers and/or bi-component fibers with a carrier and binder component. The carrier and hot-melt adhesive fibers (e.g., components) can be derived from any thermoplastic, filament-forming polymers. Additionally, carrier fibers can also be derived from non-fusing filament-forming polymers. Such fusible binder-consolidated spunbonded non-woven fabrics are fundamentally described, for example, in EP-A 0,446,822 and EP-A 0,590,629.

Examples of polymers from which the carrier fibers (e.g., the carrier fiber components) can be derived are polyacrylonitrile, essentially aliphatic polyamides, such as nylon 6.6, primarily aromatic polyamides (aramids), such as poly-(p-phenylene terephthalate) or copolymers containing a content of aromatic m-diamine units to improve the solubility, or poly-(m-phenylene isophthalate), essentially aromatic polyesters, such as poly-(p-hydroxybenzoate), or preferably essentially aliphatic polyesters, such as polyethylene terephthalate.

The relative proportion of the two fiber types may be selected within wide limits, whilst making sure that the proportion of the hot melt adhesive fibers does not exceed the above mentioned proportion of thermoplastic binder. Through bonding the carrier fibers to the hot melt adhesive fibers, a semi-structural property that is sufficient for the desired application is achieved. The proportion of the hot-melt derived from the hot-melt fiber in the spunbonded non-woven fabric is usually 5-50% by weight, preferably 10-30% by weight (based upon the total weight of the non-woven fabric).

Hot melt polymers from the group of the polymers having a melting point decreased by 10 to 50° C., preferably 30 to 50° C. compared to the raw material of the non-woven fabric are suitable as hot melt adhesive. Examples of such hot melt adhesives are polybutylene terephthalate, or polyethylene terephthalate modified by the condensation of longer-chain diols and/or isophthalic acid or aliphatic dicarboxylic acid.

The hot melt adhesives are preferably introduced in the form of fibers as staple fibers or endless yarns into the spunbonded non-woven fabric or in the form of so-called bi-component fibers, wherein the above-mentioned materials for the carrier fibers form the mechanical strength and the above-mentioned materials for the hot melt adhesive fibers form the second component of the bi-component fiber, which are used for the consolidation.

The carrier fibers and hot melt adhesive fibers are preferably made up of one class of polymers. This implies that all of the fibers used are selected from one class of substances, so that these can readily be recycled after usage. If the carrier fibers consist of polyester, for example, the hot melt adhesive fibers will likewise be of polyester, e.g. PBT, or selected as sheath from a mixture of polyesters, e.g. in the form of bi-component fibers with PET in the core and a polyethylene terephthalate copolymer having a low melting point. In addition, bi-component fibers may be made of different polymers. Examples of these are bi-component fibers of polyester and polyamide (core/sheath).

The monofilament titer of the carrier fibers and the hot melt adhesive fibers may be selected within said limits.

The manufacturing of the spunbonded non-woven fabric used takes place by means of individual measures and devices known per se.

The melted polymer is extruded through a plurality of spinneret rows behind one another or groups of spinneret rows and the spun polymer streams are stretched in a per se known manner, and are laid on a conveyor belt, e.g., by using a rotating baffle plate in dispersion texture. This is followed by the consolidation of the non-woven fabric.

In addition to the above-described spunbonded non-woven fabrics made of endless filaments, non-woven fabrics made of staple fibers, chopped fibers or tearing fibers, i.e. finite fibers, are also preferred. These non-woven fabrics are usually made of the same synthetic polymer like the endless fibers and can also have the above-mentioned thermoplastic binder (e.g., carrier fibers) and binding fibers (e.g., bi-component fiber), wherein the content of the thermoplastic binder is also equal to 5-50% by weight, preferably 10-30% by weight, respectively with reference to the total weight of the non-woven fabric.

Insofar as the thermoplastic binder is introduced in the form of a separate binder fiber, a granulate or in the form of the low-melting component of a bi-component fiber, one speaks of a fusible binder-consolidated non-woven fabric.

The non-woven fabrics made of staple fibers, chopped fibers or tearing fibers can also be formed as so-called hybrid non-woven fabrics. Hybrid non-woven fabrics consist of a mixture of polymeric fibers and reinforcement fibers, preferred reinforcement fibers are among others carbon fibers, in particular carbon fibers, which have an electric conductivity, glass fibers, mineral fibers, metal fibers. Preferred are reinforcement fibers, which are not based on organic synthetic polymers.

In addition to the aforementioned dry-laid non-woven fabrics, wet-laid non-woven fabrics, which can be made of organic, inorganic or mixed fibers (hybrid non-woven fabrics, see below) are also suitable.

The fiber diameter of the fibers in the textile fabric is usually equal to 0.5-20 μm, preferably 6-13 μm. The fiber length, insofar as no endless filaments are used, is equal to 4-40 mm, preferably 6-20 mm.

The implementation of the consolidation of the non-woven fabrics, in particular of the spunbonded non-woven fabrics, is also carried out by means of in principle known methods, in particular by means of thermal calendaring and/or by mechanical or hydrodynamic needling and/or by application of a binder.

The fabric composed of fibers made of synthetic polymers used are preferably non-woven fabrics and/or spunbonded non-woven fabrics.

The fibers made of synthetic polymers present in the non-woven fabrics, in particular, however, the fibers of the spunbonded non-woven fabrics, within which fibers based on polyester are particularly preferred, preferably have a single titer between 1 and 16 dtex, preferably 2 to 8 dtex. Particularly preferred are here spunbonded non-woven fabrics made of polyester filaments with the above-mentioned titers.

The staple fibers made of synthetic polymers present in the non-woven fabrics, within which fibers based on polyester are particularly preferred, preferably have a single titer between 1 and 16 dtex, preferably 2 to 8 dtex. The staple length is 10-100 mm, preferably 20-40 mm.

The weight per unit area of the textile fabric made of fibers of synthetic products, in particular of synthetic polymers, and used is between 20 and 500 g/m2, preferably between 40 and 250 g/m2. The preceding information also applies for non-woven fabrics and/or spunbonded non-woven fabrics, in particular for spunbonded non-woven fabrics based on melt-spinnable synthetic polymers, wherein polyester is particularly preferred.

In a further embodiment, such textile fabrics have at least one reinforcement. This is preferably designed in such a manner that the reinforcement absorbs a force so that the reference force in the force-elongation diagram (at 20□C) of the base interlining with reinforcement compared to the base interlining without reinforcement differs within the range between 0 and 1% of elongation in at least one point by at least 10%.

In another embodiment, the reinforcement can be incorporated in such a way that, due to the reinforcement, forces are only absorbed at higher elongations.

For economic reasons, preferred reinforcements consist of glass multifilaments in the form of—essentially—parallel yarn threads or scrims. In most cases, the non-woven fabrics are reinforced in the longitudinal direction by—essentially—parallel yarn threads.

The reinforcing filaments may be used as such or in the form of a discrete textile fabric, for example as a woven fabric, yarn sheet, knitted fabric or non-woven fabric. Reinforcements with reinforcing yarns running parallel to each other, i.e. warp sheets, as well as scrims or woven fabrics are preferred.

The measurement of the reference force is carried out in accordance with EN 29073, part 3, on 5 cm wide samples at a restraint length of 200 mm. Here, the numerical value of the pre-stress force, expressed in centi-newton, corresponds to the numerical value of the weight per unit area of the sample, expressed in gram per square meter.

The reinforcement may be carried out by the inclusion of the reinforcements in the textile fabric, on at least one face of the textile fabric or else at any location, in particular in other textile fabrics differing from the first textile fabric, or as an individual textile fabric.

The textile fabric may have further textile fabrics in addition to the textile fabric described above. Preferably, these further textile fabrics differ from the textile fabric first mentioned, i.e. they are made of a different material.

The further textile fabrics can, however, also be made of the same material as the first-mentioned textile fabric; they then have, however, other fiber dimensions that are distinguishable from the first-mentioned textile fabric. For example, the above-described spunbonded non-woven fabrics made of endless filaments, staple fibers, chopped fibers or tearing fibers can also have additional an layer made of so-called melt-blown fibers. Melt-blown fibers are manufactured by means of the melt-blown process from thermoplastic polymers and have a fiber diameter of less than 4 μm.

The textile fabric is substantially free of heavy metals (e.g., 10 ppm (parts by weight)). Heavy metals may include Pt, Au, Te, Ni, Co, Fe, Cu, Sb, Ag, Bi, Mn, and Sn. Furthermore, the textile fabric, in particular the non-woven fabric, must have a heat shrinkage rate of less than 0.1% (160° C., 10 min) for the required geometry to be obtained when shaping the gauntlets.

Binder

The textile fabric, which is preferably a non-woven fabric and/or spunbonded non-woven fabric, is subjected to a consolidation process, which is usually carried out already during the manufacture of the textile fabrics. The consolidation contributes to the fact that the textile fabric has an improved mechanical strength and can be better processed (e.g., refined).

The textile fabric, in particular the non-woven fabric and/or spunbonded non-woven fabric, is preferably consolidated by means of at least one chemical or thermoplastic binder. Chemical binders are understood to be organic compounds and substances, which harden through chemical reaction, for example cross-linking or condensation, and preferably still have thermoplastic properties.

The chemical, organic binders are fundamentally subject to no limitations, so that all organic binders known in the production of textile fabrics, preferably non-woven fabrics, can be used. Due to the use in power storage batteries of the lead-acid type, such binders, whose stability in an acidic environment is sufficient and that have in addition a content of less than 10 ppm (parts by weight) of the above-mentioned disturbing heavy metals are used. These binders are known to the person skilled in the art. Preferably, the chemical, organic binders are binders based on butadiene styrene, phenol formaldehyde, melamine formaldehyde, urea formaldehyde or mixtures therefrom, formaldehyde-free binders, self-cross-linking or thermally induced cross-linking binders, which completely react through chemically without any addition of a catalyst. The cross-linking is preferably induced thermally. Suitable binders are among others acrylate-based dispersion binders, which have thermoplastic properties.

Insofar as the textile fabric, which is preferably a non-woven fabric and/or spunbonded non-woven fabric, is consolidated with a binder, at least an electrically conductive additive is preferably added to the binder, so that an additive-binder system is used for consolidation. The term "additive-binder system" represents a mixture of at least 70-98% by weight of at least one chemical and/or thermoplastic organic binder and at least 2-30% by weight of at least one electrically conductive additive.

The content of consolidated binder, which has thermoplastic properties, is between 5 and 50% by weight, preferably between 5 and 40% by weight, particularly preferred between 10 and 25% by weight, wherein the value refers to the fully equipped and fully hardened textile fabric after complete drying. Particularly preferably, in addition to the above-mentioned binder, which has thermoplastic properties, binder, which have no thermoplastic properties are available only in small amounts, i.e. in amounts of up to 10% by weight with reference to the whole binder quantity; particularly preferred are binder, which have no thermoplastic properties.

The content of electrically conductive additive is between 1 and 10% by weight, preferably between 2 and 6% by weight, wherein the value refers to the fully equipped and fully hardened textile fabric after complete drying.

The organic binder(s) in the additive-binder system can be available as real dispersions, colloidally dispersed or molecularly dispersed dispersions, generally though as so-called partial dispersions, i.e. aqueous systems, which are in part molecularly dispersed and in part colloidally dispersed.

Insofar as the organic binder(s) in the additive-binder system is to be used as an aqueous polymer dispersion or polymer solution, the solids content is preferably between 30 and 70% by weight, in particular between 35 and 65% by weight, particularly preferred 40 to 60% by weight (determined according to DIN EN ISO 3251:2008).

Insofar as the organic binder(s) of the additive-binder system are to be used as an aqueous polymer dispersion, the viscosity is preferably 50 to 20000 mPa*s, in particular 100 to 8000 mPa*s, particularly preferred 900 to 4000 mPa*s (determined according to EN ISO 2555:1999).

Insofar as the organic binder(s) in the additive-binder system are to be used as an aqueous polymer dispersion, the pH-value (measured as a 10% by weight solution in water) is between 1, 5 and 10, preferably between 4 and 9 (determined according to ISO 976:2013-12).

Insofar as the textile fabric, in particular the non-woven fabric and/or spunbonded non-woven fabric, is shaped as a fusible binder-consolidated spunbonded non-woven fabric or a fusible binder-consolidated non-woven fabric, the use of chemical (e.g., thermoplastic) binder can be foregone completely or partially. In some embodiments, the electrically conductive additive is applied (e.g., inserted) by means of an impregnating (e.g., coating) compound into the fusible binder-consolidated non-woven fabric (e.g., spunbonded non-woven fabric).

The term "impregnating or coating compound" represents a mixture of at least 10% by weight of at least one chemical organic binder and at least 2% by weight of at least one electrically conductive additive, with which the electrically conductive additive is applied (e.g., inserted) into the fusible binder-consolidated non-woven fabric (e.g., spunbonded non-woven fabric).

The chemical or thermoplastic, organic binders for the impregnating or coating compound are understood to be the binders referred to under the generic term additive-binder system, which are likewise suitable.

The content of consolidated binder, which has thermoplastic properties, is between 5 and 50% by weight, preferably between 5 and 40% by weight, particularly preferred between 10 and 25% by weight, wherein the value refers to the fully equipped and fully hardened textile fabric after complete drying. Particularly preferably, in addition to the above-mentioned binder, which has thermoplastic properties, binder, which have no thermoplastic properties are available only in small amounts, i.e. in amounts of up to 10% by weight with reference to the whole binder quantity; particularly preferred are binder, which have no thermoplastic properties.

The content of electrically conductive additive is between 1 and 10% by weight, preferably between 2 and 6% by weight, wherein the value refers to the fully equipped and fully hardened textile fabric after complete drying. The organic binders can be available as real dispersions, colloidally dispersed or molecularly dispersed dispersions, generally though as so-called partial dispersions, i.e. aqueous systems, which are in part molecularly dispersed and in part colloidally dispersed.

Insofar as the organic binders are to be used as an aqueous polymer dispersion or polymer solution, the solids content is preferably between 30 and 70% by weight, in particular between 35 and 65% by weight, particularly preferred 40 to 60% by weight (determined according to DIN EN ISO 3251:2008).

Insofar as the organic binders are to be used as an aqueous polymer dispersion, the viscosity is preferably 50 to 20000 mPa*s, in particular 100 to 8000 mPa*s, particularly preferred 900 to 4000 mPa*s (determined according to EN ISO 2555:1999).

Insofar as the organic binders are to be used as an aqueous polymer dispersion, the pH-value (measured as a 10% by weight solution in water) is between 1, 5 and 10, preferably between 4 and 9 (determined according to ISO 976:2013-12).

Electrically Conductive Additives

The electrically conductive additives are fundamentally subject to no limitations, so that all additives with an electrical conductivity are used.

The electrically conductive additives cause that the surface resistance of the textile fabric equipped with the additive decreases to a value of 103 Ohm and less. The surface resistance is determined according to DIN 54345-1:1992-02.

The electrically conductive additives cause that the specific contact resistance of the textile fabric equipped with the additive decreases to a value of 104 Ohm and less. The specific contact resistance is determined according to DIN 54345-1:1992-02.

Due to the use in power storage batteries of the lead-acid type, such electrically conductive additives, whose stability in an acidic environment is sufficient are used. Suitable electrically conductive additives used are preferably electrically conductive particle-shaped materials based on carbon, preferably carbon black, in particular acetylene black, graphite, nano-graphite (graphene) or an electrically conductive fiber-shaped material based on carbon, carbonized carbon, in particular graphite, nano-graphite or electrically conductive alcohols.

Suitable carbonic and electrically conductive additives are commercially available. Examples are "Carbofin conductive L" or "Carbofin L" of the company Rockwood, or also similar products from other manufacturers.

The additive-binder system or impregnating/coating compound may also contain up to 10% by weight of additives, wherein these are not electrically conductive additives. These are commercially available additives such as preservatives, stabilizers, antioxidants, anti-foaming agents, hydrophilizing agents, UV stabilizers, fillers and/or pigments. They are partly contained in the commercial products and serve to stabilize storage and transport or may be added later in order to meet the customer's specifications.

The electrically conductive additives are added to the organic binder of the additive-binder system (e.g., the impregnating/coating compound) and applied jointly onto the textile fabric. The application can lead to a full penetration and impregnation of the textile fabric or to a single-side or bilateral coating of the textile fabric. Subsequently, the chemical organic binder is hardened by chemical reaction and any existing volatile substances, e.g. water, are removed by means of drying.

The textile fabric equipped with the consolidated binder and electrically conductive additive preferably has an air permeability between 10,000 and 500 l/m2s @ 200 Pa, measured according to EN ISO 9237:1995-12.

The textile fabric equipped with consolidated binder and electrically conductive additive preferably has a maximum tractive force (in the longitudinal direction) of at least 150 N/5 cm, particularly preferred at least 200 N/5 cm, measured according to DIN EN 29073-3:1992-8.

The textile fabric equipped with consolidated binder and electrically conductive additive preferably has a maximum tractive force (in the transverse direction) of at least 100 N/5 cm, particularly preferred at least 150 N/5 cm, measured according to DIN EN 29073-3:1992-8.

The burst pressure B1 of the textile fabric equipped with the consolidated binder and electrically conductive additive is at least 800 kPa. The burst pressure is a measure for the mechanical stability of the gauntlets, which is of great importance in particular during their manufacture and the operation. The burst pressure is usually determined by means of an expandable rubber sleeve, which is inserted into the tube bags and pressurized with compressed air. The change of the diameter of the gauntlet tube when applying the pressure B1 is less than 2% with reference to the initial diameter of the gauntlet. The determination of the burst pressure B2 is carried out by further increase of the internal pressure in the rubber sleeve up to the bursting point of the tube bag. The burst pressure B2 of the textile fabric equipped with the consolidated binder and electrically conductive additive is at least 2200 kPa.

The textile fabric equipped with consolidated binder and electrically conductive additive preferably has a tear resistance (in the longitudinal direction) of at least 3 daN, particularly preferred at least 5 daN, measured according to DIN EN ISO 9073-4:1997.

The textile fabric equipped with consolidated binder and electrically conductive additive preferably has a tear resistance (in the transverse direction) of at least 3 daN, particularly preferred at least 5 daN, measured according to DIN EN ISO 9073-4:1997.

The textile fabric has a heat shrinkage rate >0.1%, preferably >0.5% at 160° C. (hot air).

The textile fabric has a low hairiness of the surface of non-woven fabric.

Particularly preferably, a textile fabric is used, which has a combination of the above-mentioned parameters of air permeability, maximum tractive force (in the longitudinal and/or transverse direction) and further tear strength. Particularly preferably, a textile fabric is used, which has a combination of the above-mentioned parameters of air permeability, maximum tractive force (in the longitudinal and/or transverse direction) and further tear strength (in the longitudinal and/or transverse direction).

In a further embodiment, the electrically conductive additives are added to the polymer material, which forms the fibers of the textile fabric. For example, the electrically conductive additive may be added to the polymer in the melt extruder or via a master-batch dosing. The quantity of electrically conductive additive is between 1% and 30% by weight (weight percent), each with reference to the total weight of the textile fabric.

Manufacturing

The manufacture of the textile fabric as well as the equipment with the additive-binder system or impregnating/coating compound takes place by methods and processes.

The manufacture of the textile fabric with the additive-binder system is carried out by means of the following measures:

A) formation of a textile fabric as described above and optionally mechanical and/or thermal consolidation thereof,
B) application of the above-described additive-binder system (e.g., the impregnating/coating compound)
C) drying and consolidation of the binder from the additive-binder system (e.g., the impregnating/coating compound).

The formation of the textile fabric is carried out by means of known measures. The implementation of the mechanical consolidation optionally carried out also takes place by means of in principle known methods.

Preferably, the non-woven fabric (e.g., spunbonded non-woven fabric) is consolidated by means of mechanical needling and/or calendaring.

Preferably, a thermal calendaring is carried out at a calendaring temperature of 120-160° C. The embossing of the calendar can have a structure, e.g. a rhombic, point or rod structure or be smooth. In addition to the consolidation of the non-woven fabric, the thermal calendaring also serves to reduce the so-called hairiness of the surface of the non-woven fabric, which would significantly affect the use of the non-woven fabric for the intended applicability. This is followed by the impregnation of the non-woven fabric (e.g., spunbonded non-woven fabric) with the additive-binder system (e.g., the impregnating/coating compound). The inclusion of the optionally present reinforcement is carried out during or after the formation of the textile fabric or before or during the application of the additive-binder system (e.g., the impregnating/coating compound). The supply of the reinforcement and optionally any further heat treatment in the manufacturing process preferably takes place under stress, in particular longitudinal stress.

Alternatively, the non-woven fabric (e.g., spunbonded non-woven fabric) is consolidated by means of mechanical needling (e.g., hydrodynamic needling). In this case, the needling is controlled in such a manner that a needling density of 10-100 stitches/cm2 is achieved. In particular, a needling density of 30-50 stitches/cm$^2$ is preferred. A higher hole density improves the ion transport through the non-woven fabric, without, however, affecting the mechanical strength of the non-woven fabric.

The consolidation of the non-woven fabric can also be carried out by means of the described needling with subsequent calendaring.

The supply of further textile fabrics optionally to be included takes place before or during the consolidation of the additive-binder system (e.g., the impregnating/coating compound).

The applied quantities and other nature of the additive-binder system (e.g., the impregnating/coating compound) was already described in detail at the beginning and is also valid for the method. The application is also carried out by means of known methods.

Drying or consolidation of the binder is also carried out by means of methods known to the person skilled in the art, wherein temperatures of 120° C. to 250° C., preferably 140-160° C., prove to be advantageous. The drying (e.g., thermal treatment) causes among others a chemical reaction of the binder and leads to its hardening. The drying takes place, just as any heat treatment in the manufacturing process, preferably under stress, in particular longitudinal stress.

If the textile fabric contains no binder, the application of the additive-binder system (e.g., the impregnating/coating compound) onto the mechanical and/or thermal consolidated non-woven fabric is carried out by means of known application methods.

In some embodiments, the electrically conductive additives, as was already described, are introduced as masterbatches or compound directly into the fiber polymer during the fiber spinning process. The filaments or staple fiber polymers can contain conductive additives, and also the hot melt polymers for thermally consolidated non-woven fabrics. Insofar as the fiber are present as bi-component fibers, dosing (e.g., adding) the electrically conductive additive can also be carried out only into the sheath material of a bi-component fiber of the core shell type.

The manufacture of the tubular bags of the cartridge belt type composed of the textile fabrics equipped with the additive-binder system (e.g., the impregnating/coating compound) is carried out by known measures, e.g. as described in WO 2007/090893.

In the standard method, two textile fabrics, in particular non-woven fabrics and/or spunbonded non-woven fabrics are laid one above the other and sewed with each other. The seams run parallel and at a distance of a few millimeters up to cm from each other. Thereafter, the pins are inserted between the layers and heated up or hot pins are inserted between the layers, which deform the areas between the seams to tubes with a circular (or also polygonal) cross-section. The textile surface, including the binder, must therefore have thermoplastic properties, so that the tubular structure is preserved and remains dimensionally stable after the cooling. The temperature in this process lies in the range of 130-180° C. The heat shrinkage of the textile fabric that begins at this temperature causes that, during the shaping of the tube bags, the textile fabric shrinks exactly fitting to the heated pins. The exact geometry of the bags is thus determined by the inserted pins. The term "tubular" not only refer to cylindrical bags, which are produced by pins with cylindrical shape, i.e. a circular cross-section, but rather also multi-edge, non-cylindrical bags, which are produced by pins with a non-cylindrical shape, i.e. a polygonal cross section (number of edges is equal to or greater than 3).

For the use in lead-acid batteries, the tubular bags of the cartridge belt type are filled with an active lead paste. The filled tubes form, disposed in rows, the positive electrode of the lead-acid battery. Usually, a porous separator, e.g. a PE or glass fiber non-woven fabric or a porous polymer membrane is located between the tube bag electrode and the counter-electrode.

Measurement Methods
General measurement methods:
Air permeability:
The air permeability is determined in accordance with DIN EN ISO 9237:1995-12.
Weight per unit area:
The weight per unit area is determined in accordance with DIN EN ISO 29073-1:1992-08.
Measurement of the fiber diameter:
The fiber diameter is determined in accordance with DIN EN ISO 1973:1995-12.
Measurement of the reference force:
The measurement of the reference force is carried out in accordance with EN 29073-3:1992-083, on 5 cm wide samples at a restraint length of 200 mm. The numerical value of the pre-stress force, expressed in centi-newton (cN), here matches the numerical value of the mass per unit area of the specimen, expressed in gram per square meter.
Measurement of the surface resistance:
The surface resistance is determined according to DIN 54345-1:1992-02.
Measurement of the spec. contact resistance (volume resistivity):
The contact resistance is determined according to DIN 54345-1:1992-02.
Burst Pressure
The burst pressure is determined by cutting out a gauntlet from the sample, wherein the adjacent, longitudinally running gauntlets are separated in the middle. A rubber tube closed on one side with a burst pressure of 3 bar, a wall thickness of 1.5 mm and a slightly smaller outer diameter than the gauntlet is inserted into the gauntlet tube. Subsequently, the pressure is slowly increased in the tube by means of compressed air to 8 bar and maintained for a minute, and the change of the gauntlet diameter is determined. Subsequently, the pressure is increased to the intended measured value and maintained for a minute, without the gauntlet tube bursting at this pressure.

What is claimed is:

1. A lead-acid battery electrode, comprising,
    an electrically conductive tubular bag that is in direct contact with an active material contained therein, the electrically conductive tubular bag being formed from a textile fabric, wherein:
    the textile fabric is formed of fibers having diameters of between about 0.5 µm and 20 µm;
    the textile fabric comprises a consolidated binder with thermoplastic properties, wherein the consolidated binder comprises between about 2% and 30% by weight of an electrically conductive additive with respect to the total consolidated binder and between about 70% and 98% by weight of a thermoplastic binder with respect to the total consolidated binder; and
    the textile fabric is coated or impregnated with the consolidated binder such that the electrically conductive additive is in direct contact with the active material so as to facilitate electron movement.

2. The lead-acid battery electrode of claim 1, wherein the textile fabric is a non-woven fabric comprising at least one of synthetic polymer fibers, mineral fibers, and glass fibers.

3. The lead-acid battery electrode of claim 2, wherein the non-woven fabric comprises at least one of staple fibers, chopped fibers, and tearing fibers.

4. The lead-acid battery electrode of claim 1, wherein the textile fabric has a weight per unit area between 20 and 500 g/m2.

5. The lead-acid battery electrode of claim 1, wherein the contact resistance of the textile fabric is 10 Ohm*cm or less.

6. The lead-acid battery electrode of claim 1, wherein the textile fabric has a heat shrinkage of less than 0.1% when exposed to hot air at 160° C. for 10 minutes.

7. The lead-acid battery electrode of claim 1, wherein the quantity of electrically conductive additive is between 1% and 30% by weight of the textile fabric.

8. The lead-acid battery electrode of claim 1, wherein the specific contact resistance of the textile fabric is 104 Ohm*cm or less.

9. The lead-acid battery electrode of claim 1, wherein the electrically conductive additive is an electrically conductive particle-shaped material comprising at least one of carbon, carbon black, acetylene black, graphite, and nano-graphite.

10. The lead-acid battery electrode of claim 1, wherein the electrically conductive additive is an electrically conductive fiber-shaped material comprising at least one of carbon, carbonized carbon, graphite, nano-graphite, and electrically conductive alcohol.

11. The lead-acid battery electrode of claim 1, wherein the textile fabric comprises between 5% and 50% by weight of consolidated binder.

12. The lead-acid battery electrode of claim 1, wherein the textile fabric has a maximum tractive force in a longitudinal direction of at least 800 N/5 cm.

13. The lead-acid battery electrode of claim 1, wherein the textile fabric has a maximum tractive force in a transverse direction of at least 100 N/5 cm.

14. The lead-acid battery electrode of claim 1, comprising active lead paste within the tubular bag.

15. A lead-acid battery, comprising:
a negative electrode;
a positive electrode;
an electrically conductive tubular bag that is in direct contact with an active material contained therein, the electrically conductive tubular bag being formed from a textile fabric, wherein:
the active material comprises lead paste;
the textile fabric is formed of fibers having diameters of between about 0.5 μm and 20 μm;
the textile fabric comprises a consolidated binder with thermoplastic properties, wherein the consolidated binder comprises between about 2% and 30% by weight of an electrically conductive additive with respect to the total consolidated binder and between about 70% and 98% by weight of a thermoplastic binder with respect to the total consolidated binder; and
the textile fabric is coated or impregnated with the consolidated binder such that the electrically conductive additive is in direct contact with the active material so as to facilitate electron movement; and
a separator between the negative electrode and the positive electrode.

16. The lead-acid battery of claim 15, wherein the separator surrounds the tubular bag.

17. The lead-acid battery of claim 15, wherein the textile fabric is a non-woven fabric comprising at least one of synthetic polymer fibers, mineral fibers, and glass fibers.

18. The lead-acid battery of claim 15, wherein the electrically conductive additive is an electrically conductive particle-shaped material comprising at least one of carbon, carbon black, acetylene black, graphite, and nano-graphite.

19. The lead-acid battery of claim 15, wherein the electrically conductive additive is an electrically conductive fiber-shaped material comprising at least one of carbon, carbonized carbon, graphite, nano-graphite, and electrically conductive alcohol.

20. The lead-acid battery of claim 15, wherein the contact resistance of the textile fabric is 10 Ohm*cm or less.

21. A lead-acid battery electrode, comprising,
an electrically conductive tubular bag that is in direct contact with an active material contained therein, the electrically conductive tubular bag being formed from a textile fabric, wherein:
the textile fabric is formed of fibers having diameters of between about 0.5 μm and 20 μm;
the textile fabric comprises a consolidated binder with thermoplastic properties, wherein the consolidated binder comprises between about 2% and 30% by weight of an electrically conductive additive with respect to the total consolidated binder and between about 70% and 98% by weight of a thermoplastic binder with respect to the total consolidated binder; and
the textile fabric is coated or impregnated with at least one electrically conductive additive that is in direct contact with the active material so as to facilitate electron movement, wherein the quantity of electrically conductive additive is between 1% and 30% by weight of the textile fabric.

22. The lead-acid battery electrode of claim 21, wherein the quantity of electrically conductive additive is between 2% and 6% by weight of the textile fabric.

* * * * *